Dec. 30, 1952  A. V. RAUGHT  2,623,310
WHEEL TRACK ATTACHMENT FOR TRACTORS
Filed June 19, 1946  2 SHEETS—SHEET 1
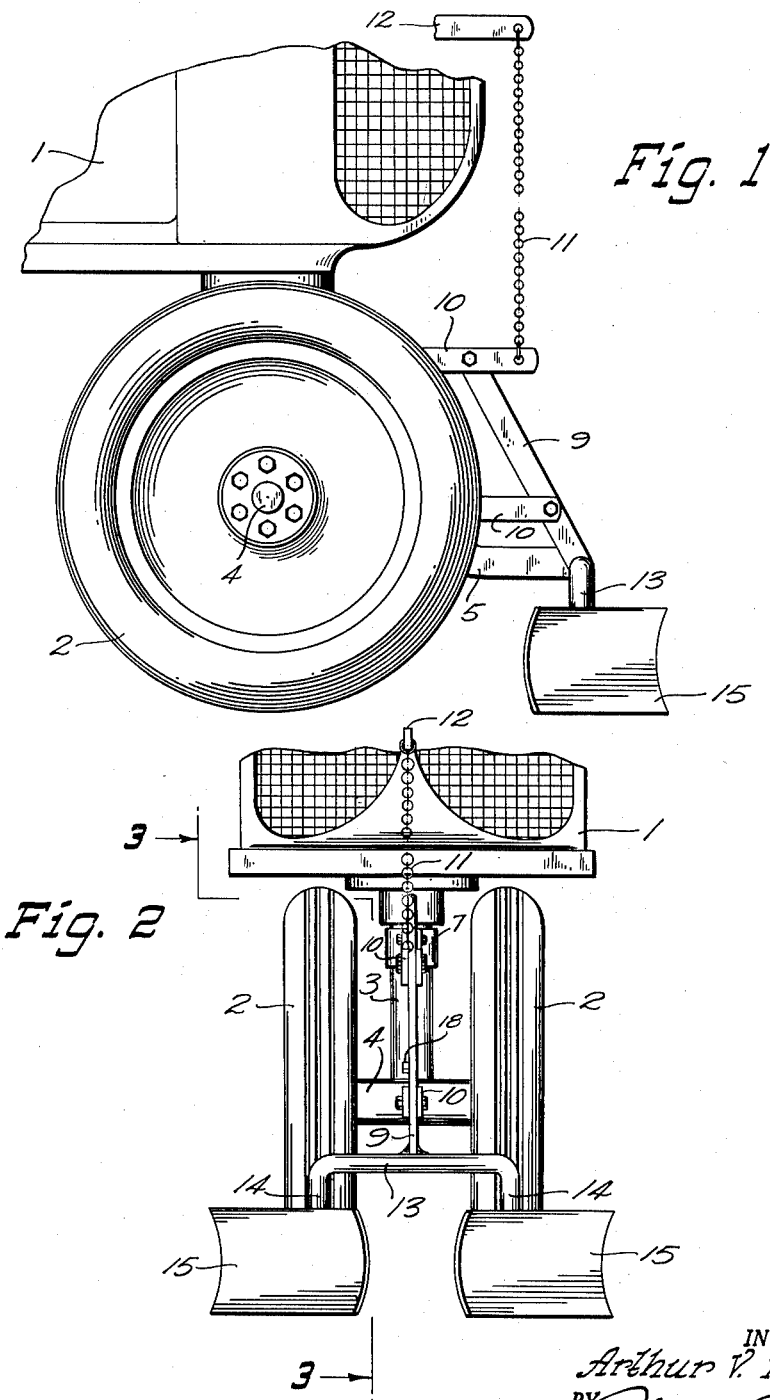
INVENTOR.
Arthur V. Raught
BY
Elwin A. Andrus
Attorney

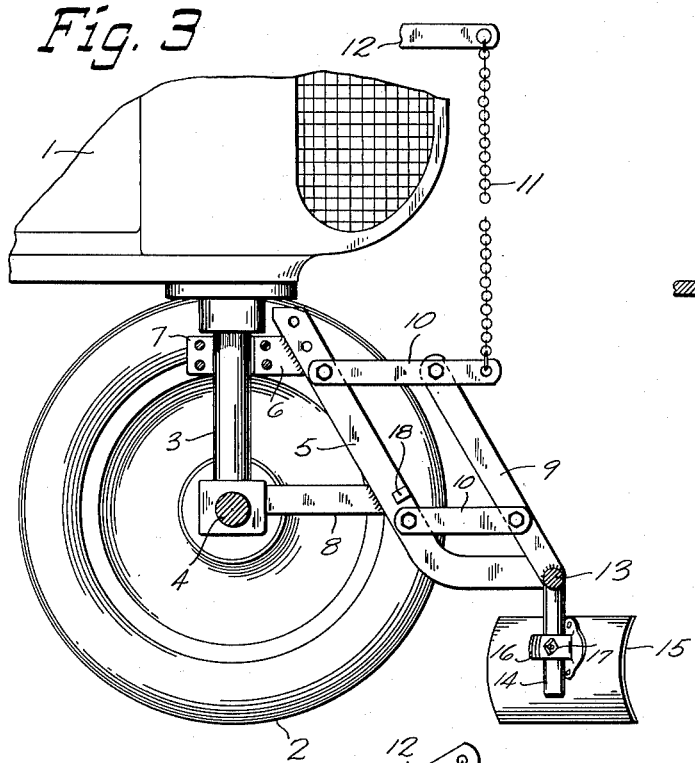
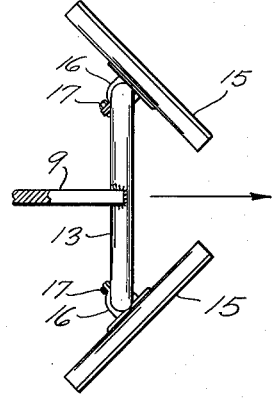
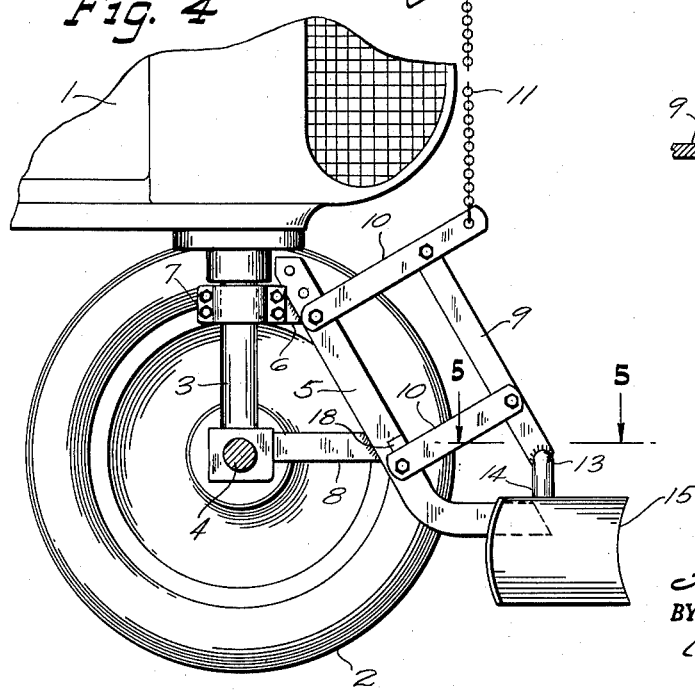
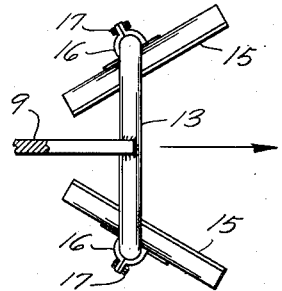

Patented Dec. 30, 1952

2,623,310

UNITED STATES PATENT OFFICE 2,623,310

WHEEL TRACK ATTACHMENT FOR TRACTORS

Arthur V. Raught, Rockford, Ill., assignor to J. I. Case Company, Racine, Wis., a company of Wisconsin Application June 19, 1946, Serial No. 677,868

3 Claims. (Cl. 37—181)

This invention relates to a wheel track attachment for tractors.

The attachment is removably secured to the front end of a farm tractor of the tricycle type usually employed for row cultivating and the like.

When cultivating parallel to the rows of a crop without employing the invention, the front steering wheels have a tendency to climb up the sides of the central furrow in which they run, particularly if the furrow is not straight, resulting in the destruction of plants either by the cultivator shovels or the front wheels.

When cross cultivating without employing the invention, as in the case of checked crops, the wheels pass across the previously formed furrows, resulting in an undulating motion for the tractor tending to alternately raise and lower the cultivator shovels so that they do not maintain the desired uniform working depth.

Where the wheel base of the tractor is such that the front and rear wheels engage corresponding rises simultaneously, or corresponding drops simultaneously, this change in depth of the cultivator shovels is at a maximum. Where the tractor wheel base is different from the above so that the front wheel lowers as the rear wheels rise and vice versa, the alternate tilting of the tractor is extremely uncomfortable to the operator of the tractor.

Attempts have been made to provide leveler attachments for leveling the ground ahead of the front wheels, but in most instances such attachments have been expensive and not very durable.

One of the objects of the present invention is to provide a wheel track attachment which is stronger and of lighter weight and less cost.

Another object of the invention is to provide an attachment which more effectively levels the ground ahead of the front wheels of the tractor.

Another object is to provide an attachment capable of straightening the furrow ahead of the front wheels of the tractor.

Another object is to provide a more effective shovel and shovel mounting for the leveler.

Another object is to provide a more simple mounting for the attachment.

An embodiment of the invention is illustrated in the accompanying drawings in which:

Figure 1 is a side elevation of the forward end of a cultivator tractor having the attachment secured thereto;

Fig. 2 is a front elevation of the same;

Fig. 3 is a vertical section taken on line 3—3 of Fig. 2;

Fig. 4 is a section similar to Fig. 3 showing the blades in raised position;

Fig. 5 is a transverse horizontal section taken on line 5—5 of Fig. 4; and

Fig. 6 is a similar section showing the leveler blades in another position.

The attachment is shown secured to the forward end of a tractor 1 having a pair of closely spaced front steering wheels 2 disposed beneath the front end of the engine.

A vertical steering post 3 extends downwardly between the wheels 2 and is secured to the transverse axle 4 for the wheels to thereby support the front end of the tractor and effect steering by rotational movement of the steering post under the control of the operator.

The attachment comprises a forwardly and downwardly slanting bracket 5 which has its upper end welded to an ear 6 extending rearwardly and fitting between the members of a two piece clamp 7 encircling the steering post 3. The clamp 7 is tightened upon post 3 by means of bolts so that the clamp 7 and bracket 5 turn with the post when the tractor is turned. Bracket 5 preferably extends upwardly beyond ear 6 to a position adjacent the tractor frame surrounding the steering post.

A brace 8 extends rearwardly from bracket 5 near its lower end to engage the lower end of steering post 3 and support the bracket against the rearward thrust of the leveler blades during operation.

The lower end of bracket 5 extends forwardly to engage the leveler arm 9 and serve as a stop supporting the arm against the rearward thrust of the leveler blades during operation.

The leveler arm 9 is spaced forwardly from bracket 5 and is linked thereto by two vertically spaced substantially parallel horizontal links 10 of substantially equal length which maintain the arm 9 generally parallel to bracket 5. The links 10 have their corresponding rear ends pivoted to bracket 5 and their corresponding forward ends pivoted to arm 9.

The upper link 10 extends forwardly of arm 9, and a chain 11 connects the same to an operating arm 12 for the cultivator, to lift the arm 9 upwardly to inoperative position.

The lower end of arm 9 has a transverse blade holder 13 welded thereto. The holder 13 is in the form of a horizontal rod having its free ends 14 bent downwardly in the central plane of the corresponding front wheel 2.

A pair of substantially vertical leveler blades or shovels 15 are employed, each being clamped to a corresponding end 14 of holder 13 at an adjustable height by the clamp 16 and bolt 17 on the back of the blade.

The clamps 16 provide for pivoting of the blades 15 to a plurality of operative positions, either throwing the dirt outwardly or inwardly.

In Fig. 5 the blades 15 are angularly disposed at about 90° to each other with the adjacent edges forward so that the dirt is pushed outwardly sidewise of the path of movement of the tractor wheels 2.

In Fig. 6 the blades 15 are angularly disposed in the opposite direction to that of Fig. 5, so that the dirt is pulled inwardly to create a ridge which passes between the wheels 2, the latter riding on opposite sides of the ridge.

In both positions, the blades 15 level the ground ahead of the corresponding wheels 2. Should the wheels drop into a cross furrow or hollow of soft ground not adequately filled by the dirt from the scraping action of blades 15, the blades do not immediately drop down to cut deeper into the ground, but instead continue forward at the same level as before for a short time until the wheels 2 return to the same level. As a result the cutting and leveling action of the blades 15 remains at the same level within predetermined limits of movement for the wheels 2.

The leveler blades 15 clear the path for the wheels 2 so that there is no tendency of the wheels to rise above the level of the blade cut.

When it is desired to operate the tractor without leveling the dirt ahead of the wheels, the chain 11 is pulled upwardly by operating arm 12 to raise the leveler arm 9 and blades 15 to inoperative position as shown in Fig. 4.

When it is desired to operate the blades 15, the arm 12 is lowered, thereby dropping chain 11, leveler arm 9 and the blades 15 to operative position. The lower end of bracket 5 serves as a stop to determine the operative position for arm 9, and the stop limits the downward movement of the arm 9 relative to the tractor preferably at a position where links 10 have not passed downwardly beyond their horizontal dead center, but are very slightly above dead center. This serves to hold blades 15 at the desired level until the load becomes too great whereupon the blades raise to prevent injury to the attachment.

A lug 18 may be provided on the side of bracket 5 at a position where it may be engaged by the lower link 10 and serve as a stop for the upward movement of the arm 9 to prevent the blades from engaging the tires.

The lower stop takes the major part of the working thrust of the blades, and cooperates with the pivotal link connections in holding the blades in operative position.

The attachment is readily secured to the tractor or removed therefrom by reason of the bolts and clamp 7.

Various embodiments of the invention may be employed within the scope of the accompanying claims.

I claim:

1. A wheel track leveler attachment for tractors comprising a bracket adapted to be removably secured to the steering post of a tractor to support a leveler shovel ahead of the front wheels of the tractor, a leveler arm spaced forwardly from the bracket, a pair of vertically spaced links joining said bracket and arm to support the latter for vertical movement between an operative and an inoperative position and provide for relative vertical movement between the leveler shovel and the front wheels of the tractor, a leveler shovel carried by said arm, and an abutment between said arm and the bracket disposed below said links and adapted to serve as a stop determining the operative position for the leveler arm relative to the tractor and transferring the major part of the working thrust from said shovel to said bracket.

2. A wheel track leveler attachment for tractors comprising a bracket having a clamp extending rearwardly therefrom to be secured to the upper portion of the steering post of a tractor, said bracket extending downwardly and forwardly from said clamp and having a rearwardly extending abutment adapted to engage the lower end of said steering post, a leveler arm spaced forwardly from the bracket, a pair of vertically spaced links joining said bracket and arm to support the latter for vertical movement between an operative and an inoperative position, a leveler shovel carried by said arm, and an abutment between said arm and the bracket disposed below said links and adapted to transfer the major portion of the working thrust of said shovel to said bracket.

3. A wheel track leveler attachment for tractors comprising a leveler shovel, an upwardly extending arm for said shovel, a bracket support for said arm adapted to be secured to the tractor, a pair of vertically spaced links having their corresponding rear ends pivoted to said bracket and their corresponding forward ends pivoted to said arm, and an abutment between said arm and bracket adapted to be engaged when said shovel is in working position to take the major working thrust away from said links and convert the latter into tension members.

ARTHUR V. RAUGHT.

REFERENCES CITED

The following references are of record in the file of this patent:

UNITED STATES PATENTS

| Number | Name | Date |
|--------|------|------|
| 717,846 | Hardin | Jan. 6, 1903 |
| 2,096,656 | Stoulil | Oct. 19, 1937 |
| 2,164,543 | Peacock | July 4, 1939 |
| 2,228,490 | Smith | Jan. 14, 1941 |
| 2,242,486 | Sutherland | May 20, 1941 |
| 2,347,373 | Silver | Apr. 25, 1944 |
| 2,416,271 | Schaapveld | Feb. 18, 1947 |